US012579376B2

(12) United States Patent
Hou et al.

(10) Patent No.: US 12,579,376 B2
(45) Date of Patent: Mar. 17, 2026

(54) LABEL PROPAGATION USING CONTRASTIVE LEARNING PROJECTIONS

(71) Applicant: Capital One Services, LLC, McLean, VA (US)

(72) Inventors: Xirui Hou, McLean, VA (US); Zhuqing Zhang, McLean, VA (US); Gang Mei, Ellicott City, MD (US)

(73) Assignee: Capital One Services, LLC, McLean, VA (US)

( * ) Notice: Subject to any disclaimer, the term of this patent is extended or adjusted under 35 U.S.C. 154(b) by 256 days.

(21) Appl. No.: 18/403,054

(22) Filed: Jan. 3, 2024

(65) Prior Publication Data

US 2025/0217602 A1 Jul. 3, 2025

(51) Int. Cl.
*G06F 40/40* (2020.01)
*G06F 40/284* (2020.01)

(52) U.S. Cl.
CPC ............ *G06F 40/40* (2020.01); *G06F 40/284* (2020.01)

(58) Field of Classification Search
CPC ........ G06F 40/40; G06F 40/284; G06F 40/30; G06F 40/35
USPC ............................................. 704/9
See application file for complete search history.

(56) References Cited

U.S. PATENT DOCUMENTS

2021/0334468 A1* 10/2021 Yu ............................ G06N 3/08

* cited by examiner

*Primary Examiner* — Thierry L Pham
(74) *Attorney, Agent, or Firm* — Foley & Lardner LLP

(57) ABSTRACT

Some embodiments can include methods and related systems to project coarse representations of natural language interactions into fine-grained representations using contrastive learning projections. Some embodiments can maximize a first set of distances between dissimilar points and anchor points in the fine-grained representations, and minimize a second set of distances between similar points and the anchor points in the fine-grained representations. Some embodiments can then propagate labels from labeled projections to unlabeled projections based on a similarity metric.

20 Claims, 3 Drawing Sheets

300

100 →

130

138

Pre-Trained
Model

120

150

102

124 — Coarse Representation Subsystem

125 — Point Selection Subsystem

126 — Contrastive Learning Subsystem

127 — Fine-Grained Representation
Subsystem

128 — Label Propagation Subsystem

<u>300</u>

LABEL PROPAGATION USING CONTRASTIVE LEARNING PROJECTIONS

BACKGROUND

In recent years, the use of artificial intelligence—including, but not limited to, machine learning, deep learning, etc. (referred to collectively herein as functions, neural networks, artificial intelligence models, machine learning models, or simply models)—has exponentially increased. Broadly described, artificial intelligence refers to a wide-ranging branch of computer science concerned with building smart machines capable of performing tasks that typically require human intelligence. Key benefits of artificial intelligence are its ability to process data, find underlying patterns, and/or perform real-time determinations.

SUMMARY

One goal of artificial intelligence is to enable smart machines to make decisions that typically require human intelligence. One way artificially intelligent systems can achieve this goal is by estimating a best-fit function, or model, which represents the relationship between features in a dataset and their corresponding labels. The features can be the input to the function or model, analogous or equivalent to the information a human might use to make the decision being modeled, and can include categories, continuous measurements, other descriptive information, etc. The labels, on the other hand, can include unsupervised classifications, human annotations, probability distributions, etc., which can be the output from the function or model, and can be analogous or equivalent to the decision itself which the human might make given the particular set of input features. This function can be defined by a variety of mathematical methods (e.g., logistic regression, Markov Chain Monte Carlo, Bayesian Estimation, Stochastic Gradient Descent, etc.), as applied to a dataset.

Despite the wide-ranging potential applications and their related benefits, implementations of artificial intelligence have been hindered by several technical problems. Namely, artificial intelligence often relies on large amounts of labeled data. Such labeled data are scarce, of variable quality, and the process for obtaining it is complex and time-consuming (especially when considering that practical implementations of artificial intelligence require specialized knowledge to design, program, and integrate artificial intelligence-based solutions, which creates a bottleneck in the number of specialists and resources available to create these practical implementations).

Embodiments of the present disclosure solve those challenges and others by providing systems and methods for propagating labels through a sparsely labeled dataset using a contrastive learning projection.

For example, contrastive learning projections solve the technical problem of label accuracy in label propagation tasks by projecting coarse representations of large datasets into fine-grained representations by maximizing distances between dissimilar points and minimizing distances between similar points. For example, a coarse representation can be formed when a model (e.g., a Large Language Model)—which has been previously trained on unrelated data-plots the large datasets within a constricted embedding space based on rules associated with the unrelated data. Such representations may serve as generic representations of the large datasets, although prove inaccurate when it comes to label propagation tasks. Fine-grained representations can solve this technical problem of label propagation accuracy. For example, the fine-grained representations can be formed when the contrastive learning projection—which has been trained on the large datasets themselves—transforms the coarse representation into an expanded projection space based on rules associated with the large datasets. Solving this technical problem of label propagation accuracy provides the practical benefit of improving intent recognition in chatbots through programmatic annotation of unlabeled datasets by propagating labels from related labeled datasets.

In some aspects, the system may receive a dataset of logged chatbot conversations comprising a labeled portion and an unlabeled portion, wherein the labeled portion comprises user intention labels assigned to natural language interactions between users and a chatbot. The system may determine a coarse representation of the labeled portion by embedding the natural language interactions using a pre-trained model. The system may map the natural language interactions as labeled points in the coarse representation. The system may select labeled points from the coarse representation. The labeled points may comprise anchor points, similar points to the anchor points, and dissimilar points to the anchor points. The similar points may have labels that are identical to anchor point labels, and the dissimilar points may have labels that are different from anchor point labels. The system may process the anchor points, the similar points, and the dissimilar points in a contrastive learning projection configured to maximize a first set of distances between the dissimilar points and the anchor points, and configured to minimize a second set of distances between the similar points and the anchor points. The system may project the coarse representation into a fine-grained representation of the labeled portion using the contrastive learning projection. The system may use the contrastive learning projection to map labeled points as labeled projections, wherein the first set of distances are maximized up to a first margin and the second set of distances are minimized down to a second margin. The system may determine unlabeled embeddings of the unlabeled portion using the pre-trained model. The system may use the contrastive learning projection to project the unlabeled embeddings into the fine-grained representation as unlabeled projections. The system may propagate labels from the labeled projections to the unlabeled projections based on a similarity metric.

Various other aspects, features, and advantages of the invention will be apparent through the detailed description of the invention and the drawings attached hereto. It is also to be understood that both the foregoing general description and the following detailed description are examples, and not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification "a portion," refers to a part of, or the entirety of (i.e., the entire portion), a given item (e.g., data) unless the context clearly dictates otherwise.

Figure 1:
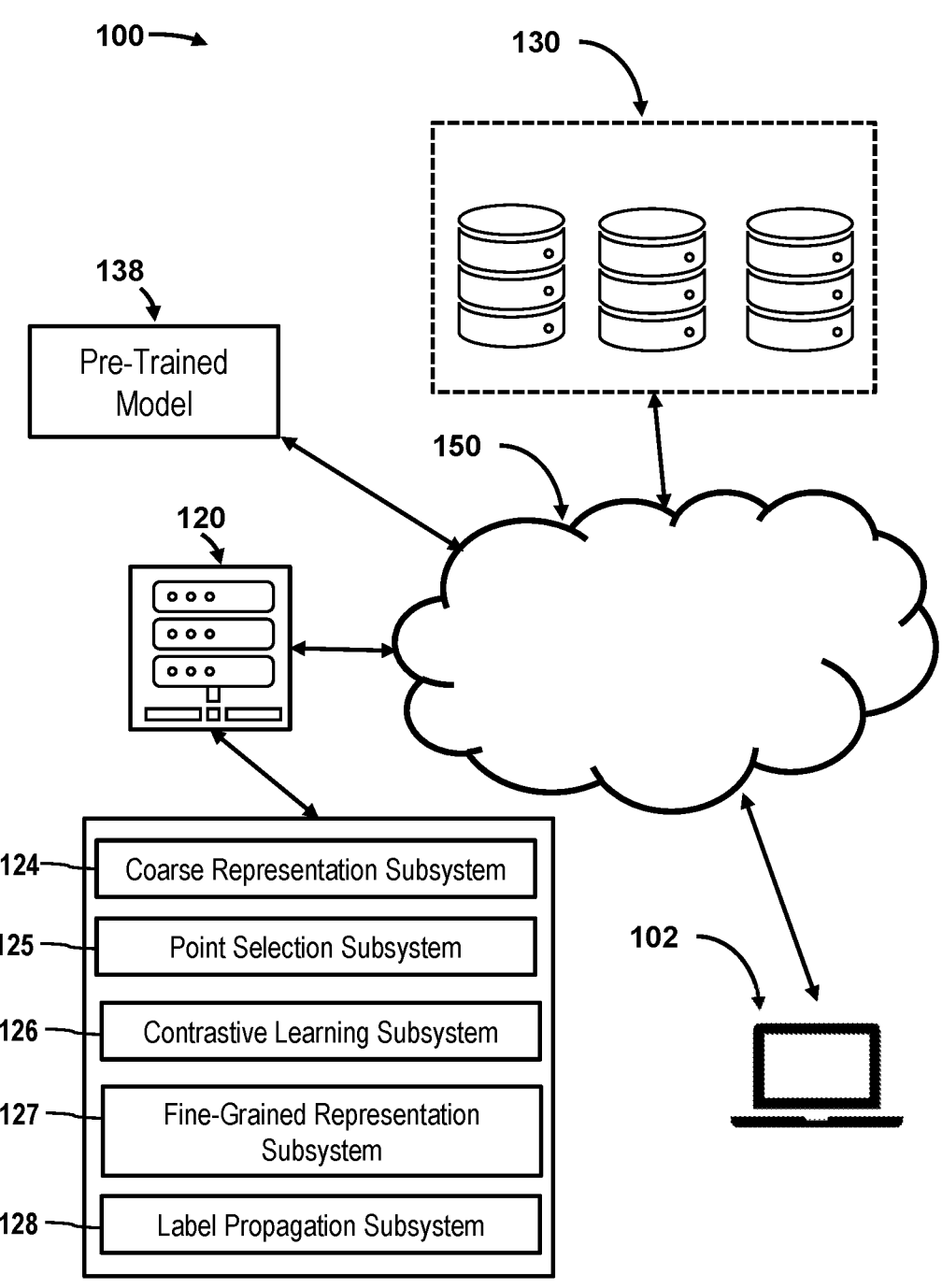
FIG. 1 shows an illustrative diagram of a system for improving intent recognition in a chatbot using contrastive learning projections, in accordance with one or more embodiments.

The technologies described herein will become more apparent to those skilled in the art by studying the detailed description in conjunction with the drawings. Embodiments of implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

In the following description, for the purposes of explanation, numerous specific details are set forth in order to provide a thorough understanding of the embodiments of the invention. It will be appreciated, however, by those having skill in the art that the embodiments of the invention can be practiced without these specific details or with an equivalent arrangement. In other cases, well-known structures and devices are shown in block diagram form in order to avoid unnecessarily obscuring the embodiments of the invention.

FIG. 1 shows an illustrative diagram of a system 100 for improving intent recognition in a chatbot using contrastive learning projections, in accordance with one or more embodiments. The system 100 includes a client computing device 102. While shown as a laptop computer, it should be noted that the client computing device 102 can include other types of computing devices, such as a desktop computer, a tablet computer, a hand-held computer, and other computer equipment (e.g., a server), a "smart" device, a wireless device, a wearable computing device, or other types of mobile computing devices, etc. In some embodiments, the client computing device 102 can communicate with various other computing devices via a network 150, where the network 150 can include the Internet, a local area network, a peer-to-peer network, etc.

The client computing device 102 can send and receive messages through the network 150 to communicate with a set of servers 120 and a set of databases 130, where the set of servers 120 and/or the set of databases 130 can include a set of non-transitory storage media storing program instructions to perform one or more operations of subsystems 124-128. While one or more operations are described herein as being performed by particular components of the system 100, those operations can be performed by other components of the system 100 in some embodiments. For example, one or more operations described in this disclosure as being performed by the set of servers 120 can instead be performed by the client computing device 102. Additionally, or alternatively, multiple users can interact with one or more components of system 100. For example, a first user and a second user can interact with the system 100 using two different mobile computing devices, where the first user can use the client computing device 102 to input a query to a chatbot. The client computing device 102 can also present, on a display component of the client computing device 102, a set of recommended resources in response to the query. Furthermore, some embodiments can communicate with an application programming interface (API) of a third-party service via the network 150 to perform various operations disclosed herein.

The system 100 is configured to propagate labels through a dataset using a contrastive learning projection. For example, some embodiments can receive a dataset with a labeled portion and an unlabeled portion. By comparing and contrasting the data within the labeled portion, some embodiments can create a representation of the dataset as a whole that moves similar data closer together and the dissimilar data further apart. In some embodiments, the dataset can include natural language interactions (e.g., logged chatbot conversations), and in such embodiments, the labels of the labeled portion can include user intents (e.g., bill pay, user representative, fraud alert) that are assigned to the natural language interactions. In some embodiments, the dataset can be stored in the set of databases 130, from the client computing device 102, or a combination of the two, and accessible via the network 150.

As described, a coarse representation can be a topology used to represent a dataset of general text that is output by a model. For example, the topology can be a vector-space, or a Euclidean space. In some embodiments, the dataset of general text includes a large corpus of unrelated text documents concerning varying subjects and written by many different authors. In some example embodiments, the model can be a Large Language Model, or another language model as outlined in this specification. The topology can have dimensions associated with weights (e.g., nodes, artificial neurons, or layers). Within the dimensions, words—taken from sentences extracted from the dataset—can be plotted as points. Because the underlying dataset of the coarse representation contains many different text documents comprising many different contexts, the positions of the words in the coarse representation can be used to predict general words. This can make the dimensions skewed, and give the coarse representation its "coarse" character—or general predictive power—which can be ill-suited for predicting specific words or intentions given a specific language dataset (e.g., interactions between users and a chatbot on a specific website).

As described, a fine-grained representation can be a detailed topology, or a refinement of the topology from the coarse representation (e.g., a projection of a vector-space into a projected space, or a projection of a Euclidean space into a projected space). The detailed topology can be output by a contrastive learning projection which has been given the coarse representation as an input. The detailed topology can have dimensions that correspond to specific variables (e.g., nodes, artificial neurons, or layers) in a function that predicts the occurrence of a word in a sentence, or the intention of a sentence, based on a dataset of specific language (e.g., text interactions between users and a chatbot). In this way, the fine-grained representation can build upon the general assumptions of the coarse representation, given a new language dataset contained a single, specific context. The contrastive learning projection can compare and contrast the distances of words in a coarse representation, and then create a list of suggested changes to the distances which the fine-grained representation can implement. The fine-grained representation can implement the list of suggested changes by increasing or decreasing the number of dimensions, shrinking the distances between similar points, and/or increasing the distances between dissimilar points. The fine-grained representation can project the points of the coarse representation into these new positions, changing the points into "projections." These projections give the fine-grained representation its "fine-grained" character, or specific predictive power. Because the underlying dataset contains specific language, these changes in distances can enable greater accuracy in predicting the intention behind new, unlabeled language based on the same, or similar, contexts (e.g., new user conversations with similar chatbots from similar websites).

For example, a coarse representation can be formed when a model (e.g., a Large Language Model)—which has been previously trained on unrelated data—plots the large datasets within a constricted embedding space based on rules associated with the unrelated data. Such representations may serve as generic representations of the large datasets, although prove inaccurate when it comes to label propagation tasks. Fine-grained representations can solve this technical problem of label propagation accuracy. For example, the fine-grained representations can be formed when the contrastive learning projection—which has been trained on the large datasets themselves—transforms the coarse representation into an expanded projection space based on rules associated with the large datasets. Solving this technical problem of label propagation accuracy provides the practical benefit of improving intent recognition in chatbots through programmatic annotation of unlabeled datasets by propagating labels from related labeled datasets.

The system 100 is configured to output coordinates in a graph representation of the dataset based on features of the language in the dataset. For example, in some embodiments, the system 100 determines a coarse representation of the labeled portion of the dataset by embedding the natural language interactions as labeled points using a pre-trained model 138. In some embodiments, the pre-trained model 138 applies a set of generic syntax rules to the natural language interactions to produce a constricted embedding space for the coarse representation. For example, the set of generic syntax rules can include the relationship between a subject and its verb in a sentence. Applying such a general rule will map all of the text strings comprising the natural language interactions from the labeled portion in more or less the same position, with minor variations (e.g., depending on if the verb precedes the subject, or vice versa, and the amount of tokens and/or punctuation separating the two). Consequently, the constricted embedding spaced of such a coarse representation is associated with decreased accuracy in prediction and classification tasks (e.g., label propagation, or intent classification). For example, the generic syntax rules can be associated with an unrelated language dataset used to train the pre-trained model 138, which includes a generic context that is different from a specific context associated with the dataset. In some embodiments, the pre-trained model 138 can be a Large Language Model (LLM), or a neural network with an alternate architecture, including Multi-Layer Perceptrons, Convolutional Neural Networks, Long-Short Term Memory models, or other models including layer from the foregoing architectures in varying orders and sequences. The coarse representation can be generated by a coarse representation subsystem 124, retrieving the labeled portion of the dataset from the set of databases 130, and then providing this labeled portion as input to the pre-trained model 138 over the network 150.

The system 100 is configured to separate similar data from dissimilar data based on the coordinates of the data on the graph. In some embodiments, the system 100 selects labeled points from the coarse representation. The labeled points can include anchor points, similar points to the anchor points, and dissimilar points to the anchor points. The similar points can have labels that are identical to anchor point labels, and the dissimilar points can have labels that are different from anchor point labels. In some embodiments, this selection process is accomplished by a point selection subsystem 125, which assigns similarity designations to the points of the coarse representation based on their respective labels and coordinates. In some embodiments, the labeled points of the coarse representation are transmitted to the point selection subsystem 125 from the coarse representation subsystem 124.

The system 100 is configured to shrink the distances between similar data and expand the distances between dissimilar data in the labeled portion. In some embodiments, the system 100 processes the anchor points, the similar points, and the dissimilar points in a contrastive learning projection configured to maximize a first set of distances between the dissimilar points and the anchor points, and configured to minimize a second set of distances between the similar points and the anchor points. For example, the contrastive learning projection can be implemented in a contrastive learning subsystem 126, which is given the relevant points from the labeled portion of the dataset from the point selection subsystem 125, and outputs the changes to the distances as a contrastive learning projection.

The system 100 is configured to apply the changes made to the distances between data to the graph itself and determine an improved graph that enables unlabeled datapoints from the same dataset to be labeled with greater accuracy. For example, in some embodiments, the system 100 projects the coarse representation into a fine-grained representation of the labeled portion using the contrastive learning projection to map labeled points as labeled projections, wherein the first set of distances are maximized up to a first margin and the second set of distances are minimized down to a second margin. The system 100 can determine such a fine-grained representation using a fine-grained representation subsystem 127, which has been given a contrastive learning projection as input from the contrastive learning subsystem 126.

In some embodiments, the fine-grained representations can be formed when the contrastive learning projection transforms the coarse representation into an expanded projection space based on a set of specific syntax rules associated with the natural language interactions themselves. For example, the set of specific syntax rules can include the relationship between a user intent to report potential fraud, and a specific phone number associated with frequent spam calls. Applying this specific rule to the natural language interactions will map a specific portion of the labeled dataset (e.g., only those interactions with a chatbot pertaining to this specific spam caller) in a different position from the rest of the labeled portion of the dataset. Consequently, the expanded projection space of such a fine-grained representation is associated with increased accuracy in prediction and classification tasks (e.g., label propagation, or intent classification).

The system 100 is configured to determine coordinates in the graph for the unlabeled portion of the dataset using the model. In some embodiments, the system 100 determines unlabeled embeddings of the unlabeled portion using the pre-trained model 138. For example, the coarse representation subsystem 124 can access the unlabeled portion of the dataset from the set of databases 130 over the network 150, and provide this as input to the pre-trained model 138. In some embodiments, the unlabeled portion can be provided by a user from the client computing device.

The system 100 is configured to translate the coordinates of the unlabeled portion from the graph to an improved set of coordinates in the improved graph. In some embodiments, the system 100 projects the unlabeled embeddings into the fine-grained representation as unlabeled projections using the contrastive learning projection. For example, the contrastive learning subsystem 126 can apply the same changes used to separate coordinates in the labeled portion to the unlabeled portion, transmitting the contrastive learning projection and the unlabeled data as input in the fine-grained representation subsystem 127.

With the improved set of coordinates, the system 100 is configured to label the unlabeled portion based on its more accurate position relative to the labeled portion in the improved graph. In some embodiments, the system 100 propagates labels from the labeled projections to the unlabeled projections based on a similarity metric. For example, a label propagation subsystem 128 can use the distance between an unlabeled projection and a nearest neighborhood of labeled projections in the fine-grained representation to calculate the label from the nearest neighborhood with the greatest likelihood of describing the unlabeled projection. In some embodiments, the label propagation subsystem 128 spreads labels throughout the entirety of the unlabeled projections, moving from the unlabeled projections that are most proximal to projections with known labels, to the most distal unlabeled projections.

Figure 2:
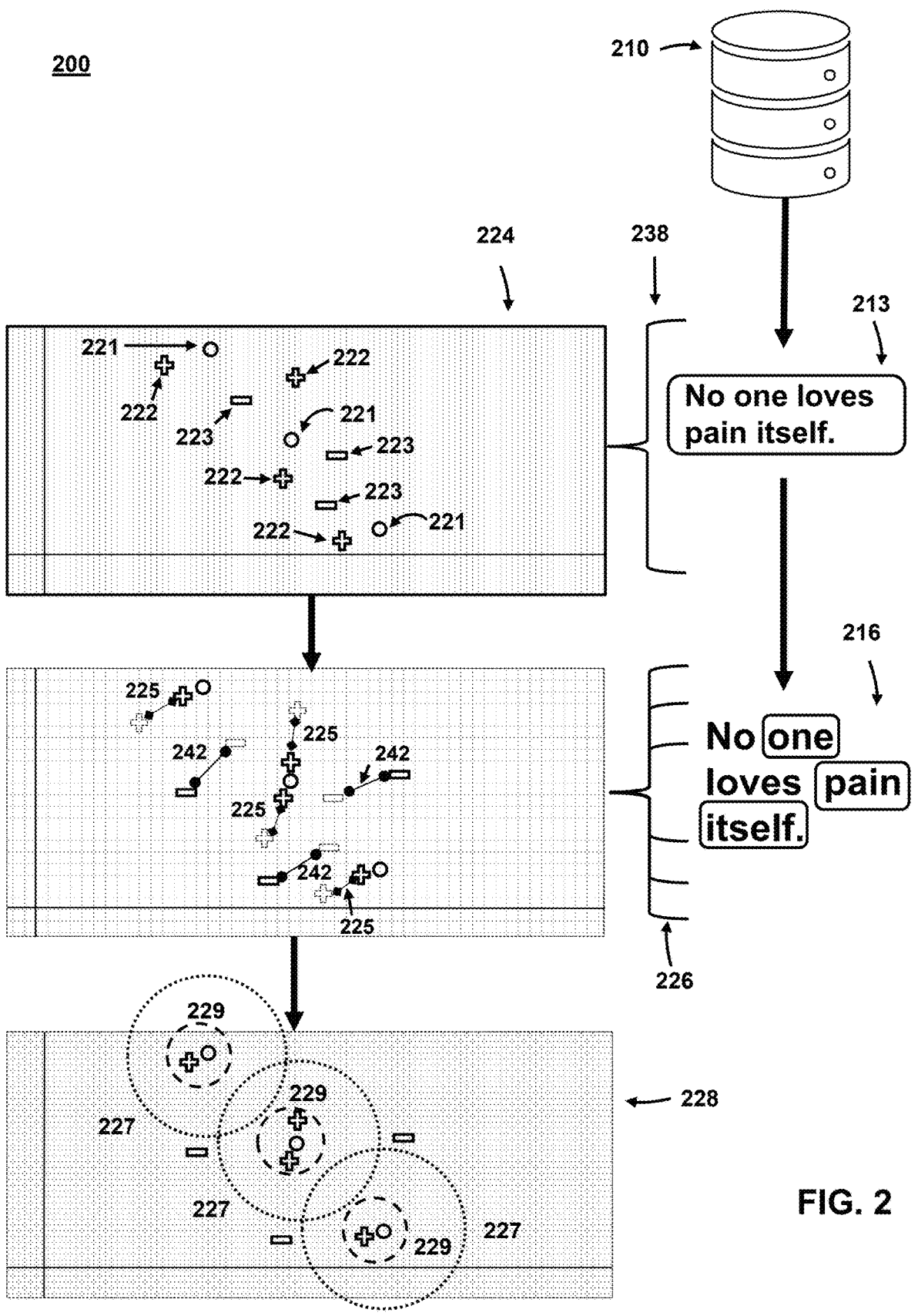
FIG. 2 shows an illustrative diagram of an architecture for transforming a coarse representation of a dataset into fine-grained representation, in accordance with one or more embodiments.

FIG. 2 shows an illustrative diagram of an architecture 200 for transforming a coarse representation 224 of a dataset into a fine-grained representation 228, in accordance with one or more embodiments. The architecture is configured to receive data that includes a labeled portion 210 and an unlabeled portion 214. In some embodiments, the dataset includes language data (e.g., questions typed by users to a chatbot), and some instances of this language data (e.g., discrete chatbot sessions that are associated with a user and a time interval) are associated with labels (e.g., user intents, such as bill pay, fraud alert, or speak with a representative). For example, the dataset can be received from a database or from a client computing device, and include natural language interactions. The natural language interactions can be split into the labeled portion 210 and the unlabeled portion. The labeled portion 210 can include user intents assigned to natural language interactions, while the unlabeled portion can include natural language interactions devoid of context or user intent.

In some embodiments, the architecture 200 determines a coarse representation of the labeled portion by embedding the natural language interactions of the labeled portion 210 using a pre-trained model 238. In some embodiments, the architecture 200 is configured to graph the language data as a coarse representation 224 using a pre-trained model 238.

In some embodiments, the pre-trained model 238 applies a set of generic syntax rules 213 to the natural language interactions to produce a constricted embedding space for the coarse representation 224. The constricted embedding space is associated with decreased accuracy in prediction and classification tasks (e.g., label propagation, or intent classification). For example, the generic syntax rules 213 can be associated with an unrelated language dataset used to train the pre-trained model 238, which includes a generic context that is different from a specific context associated with the labeled portion 210 of the dataset.

The pre-trained model 238 can graph the language data according to a set of generic rules learned from a large corpus of text that is unrelated to the language data, either the labeled portion 210 or unlabeled portion. The difference between the context of the natural language interactions and the pre-trained model 238 can be exemplified by a difference between token frequencies (e.g., the occurrence of a word or phrase in the natural language interactions versus the occurrence of that word or phrase in the large corpus of text used to train the pre-trained model 238). For example, the natural language interactions of the dataset can include a first set of token frequencies and the pre-trained model 238 can include a second set of token frequencies that is different from the first set of token frequencies.

In some embodiments, the pre-trained model 238 can be structured or otherwise generated based on at least one version of a transformer model, or a transformer-based LLM. For example, the pre-trained model 238 can be structured or otherwise generated based on GPT, BERT, etc. Some embodiments can use other types of models or tools to process or determine predictions based on a query, such as at least one version of a word2vec model, One-Hot Encoding, GloVe, EIMO, LLAMA, PaLM2, etc. Some embodiments can configure or otherwise update the pre-trained model 238 by updating model parameters (e.g., weights, biases, or other parameters) of the pre-trained model. Some embodiments can update the pre-trained model 238 based on differences between its output predictions of the pre-trained model 238 and reference feedback information (e.g., user indication of accuracy, reference labels, or other information). In some embodiments, where the pre-trained model 238 can be or can include a neural network, connection weights can be adjusted to reconcile differences between the neural network's prediction and reference feedback information. Furthermore, one or more neurons (or nodes) of the neural network can require that their respective errors are sent backward through the neural network to facilitate the update process (e.g., backpropagation of error). Updates to the connection weights may, for example, be reflective of the magnitude of error propagated backward after a forward pass has been completed. In some embodiments, the coarse representation 224 includes a first topological space (e.g., a graph) comprising a first set of dimensions, across which the natural language interactions of the labeled portion 210 of the dataset are distributed. For example, the first topological space can include a skewed topological space, in that the natural language interactions occupy a narrow, or concentrated, area within the first set of dimensions (e.g., a small area within the first set of dimensions, or a minority of the first set of dimensions). In some embodiments, the coarse representation 224 is determined by embedding the labeled portion 210 in vector space using the word2vec model as the pre-trained model 238. In some embodiments, the pre-trained model 238 includes an attention mechanism, which encodes the labeled portion 210 as matrices in the coarse representation 224. In such embodiments, the matrices in the coarse representation 224 include measures of long-range token dependencies determined by the attention mechanism and the labeled portion 210 of the language dataset.

In some embodiments, the architecture 200 selects labeled points from the coarse representation. The labeled points can include anchor points 221, similar points 222, and dissimilar points 223. In some embodiments, the similar points 222 are associated with labels that are similar or identical to labels associated with the anchor points 221. In some embodiments, the dissimilar points 223 are associated with labels that are different from the labels associated with the anchor points 221. In some embodiments, dissimilar points 223 are selected based on a measure of distance between the dissimilar points 223 and the anchor points 221. For example, the anchor points 221 can be associated with anchor vectors and the dissimilar points 223 can be associated with dissimilar vectors, and these anchor vectors and dissimilar vectors can include locations in a vector space included within the coarse representation. Measuring distances between the dissimilar vectors and the anchor vectors can be accomplished using cosine similarity. Selecting dissimilar points 223 can then be done by selecting those associated dissimilar vectors with a cosine similarity below a threshold cosine similarity. In some embodiments, dissimilar points are selected based on the value of a dot product falling below an attention threshold. In such embodiments, anchor matrices are determined by providing the anchor points 221 as inputs to an attention mechanism included in the pre-trained model 238. In such embodiments, dissimilar matrices are then determined by supplying the dissimilar points 223 to the attention mechanism. Continuing with these embodiments, the anchor matrices and the dissimilar matrices include weighted sums of vectors based on long-range token dependencies determined by the attention mechanism and the labeled portion of the language data. In some embodiments, dot-products between anchor matrices and dissimilar matrices are then determined, and dissimilar points 223 are selected based on their associated dissimilar matrices including a dot product below an attention threshold.

In some embodiments, selecting anchor points 221 can include selecting natural language interactions that are associated with user intents (e.g., user intention labels) that occur the most frequently in the labeled portion 210. For example, the labeled portion can be sliced (e.g., divided) according to user intention labels and a set of user intention frequencies can be calculated. In some embodiments, calculating user intention frequencies is accomplished by determining a size of a slice of the labeled portion associated with a user intent. In some embodiments, a set of user intention ratios is determined by dividing the set of user intention frequencies by a cardinality of the slice of the labeled portion. In some embodiments, the set of user intention ratios is then normalized.

In some embodiments, selecting dissimilar points 223 to the anchor points 221 can include selecting points that are hard negatives (e.g., those points that are the furthest away—or the most dissimilar—from the anchor points 221). For example, hard negatives can include dissimilar points that are below a hard negative threshold that demarcates a left tail of a distribution. The distribution, in some embodiments, can be of a set of distances between the dissimilar points 223 and the anchor points 221. In some embodiments, selecting dissimilar points 223 can include filtering the coarse representation 224 for points that are not associated with the label (e.g., a first label) that is associated with the anchor point 221 they are being measured against. In some embodiments, selecting dissimilar points 223 can then include augmenting the points that are not associated with the first label to generate a set of dissimilar augmented points to use for the contrastive learning projection.

As used in this description, augmenting points—whether the point is a similar point 222, dissimilar point 223, or an anchor point 221—can include manipulating the data associated with the point to generate a new, artificial instance of the labeled portion 210 of the dataset, which is associated with the same label and can be used for the contrastive learning projection 226. determining natural language interactions associated with the anchor points using the pre-trained model. Augmenting can include splitting natural language interactions into sentences, including tokens, each token including a position in a sentence. In some embodiments, swap augmentations are determined by swapping positions of one or more tokens in a sentence. In some embodiments, gap augmentations are determined by removing one or more tokens from a sentence. In some embodiments, synonym augmentations are determined using the pre-trained model 238, which can output synonyms given a token as input, and replace one or more tokens in a sentence with one or more synonyms.

In some embodiments, selecting similar points 222 to the anchor points 221 can include selecting points that are hard positives (e.g., points that are the closest—or the most similar—to the anchor points 221). For example, hard positives can include similar points that are above a hard positive threshold that demarcates a right tail of a distribution. In some embodiments, the distribution can be of a set of distance between the similar points 222 and the anchor points 221. In some embodiments, selecting similar points 222 can include augmenting the anchor points 221 to create augmentations of the anchor points 221. In some embodiments, selecting similar points can include filtering the coarse representation 224 for points that are associated with the label that is associated with the anchor point they are being compared against, and then augmenting those points.

In some embodiments, the architecture 200 processes the anchor points 221, the similar points 222, and the dissimilar points 223 in a contrastive learning projection 226. For example, the contrastive learning projection 226 can increase a first set of distances 242 between the dissimilar points 223 and the anchor points 221, and decrease a second set of distances 225 between the similar points 222 and the anchor points 221.

In some embodiments, the architecture 200 projects the coarse representation into a fine-grained representation 228 using the contrastive learning projection 226. For example, in some embodiments, the first set of distances 242 are maximized up to a first margin 227 and the second set of distances 225 are minimized down to a second margin 229. In some embodiments, the fine-grained representation 228 includes a second topological space that includes a second set of dimensions. For example, the contrastive learning projection 226 can redistribute the natural language interactions—represented as the anchor points 221, similar points 222, and dissimilar points 223—among the second set of dimensions to correct against the skewed topological space of the coarse representation. In some embodiments, the contrastive learning projection 226 accomplishes this by spreading out the natural language interactions across the second set of dimensions to occupy a more expansive area (e.g., across a more expansive area within the second set of dimensions, or across a majority of the second set of dimensions). In some embodiments, projecting the coarse representation into the fine-grained representation includes tuning the pre-trained model with the first set of token frequencies from the natural language interactions of the dataset, in order to mitigate a context of the pre-trained model 238 and allow for a mapping of the natural language interactions that is in accord with the context of the user intents.

In some embodiments, the contrastive learning projection 226 applies a set of specific syntax rules 216 to the natural language interactions to produce an expanded projection space for the fine-grained representation 228. The expanded projection space can be associated with increased accuracy in prediction and classification tasks (e.g., label propagation, or intent classification). For example, the specific syntax rules 216 can be associated with natural language interactions used to tune or train the contrastive learning projection 226, which includes a specific context.

Prior to projecting the coarse representation 224, the architecture 200 can determine the first margin 227 based on a greatest distance between a similar point 222 and an anchor point 221. Dissimilar points 223 that fall beyond the first margin 227 can include easy negatives. Dissimilar points that fall within the first margin 227 can include hard negatives. The architecture 200 can determine the second margin 229 based on a smallest distance between a dissimilar point 223 and the anchor point 221. Similar points 222 that fall beyond the second margin 229 can include hard positives, and similar points 222 that fall within the second margin 229 can include easy positives.

In some embodiments, the architecture 200 applies the processes to project the unlabeled portion into the fine-grained representation 228, first using the pre-trained model 238 to graph the unlabeled portion as embeddings and then using the contrastive learning projection 226 to project the unlabeled embeddings. In some embodiments, the architecture 200 then propagates labels from labeled projections to the unlabeled projections based on a similarity metric.

Figure 3:
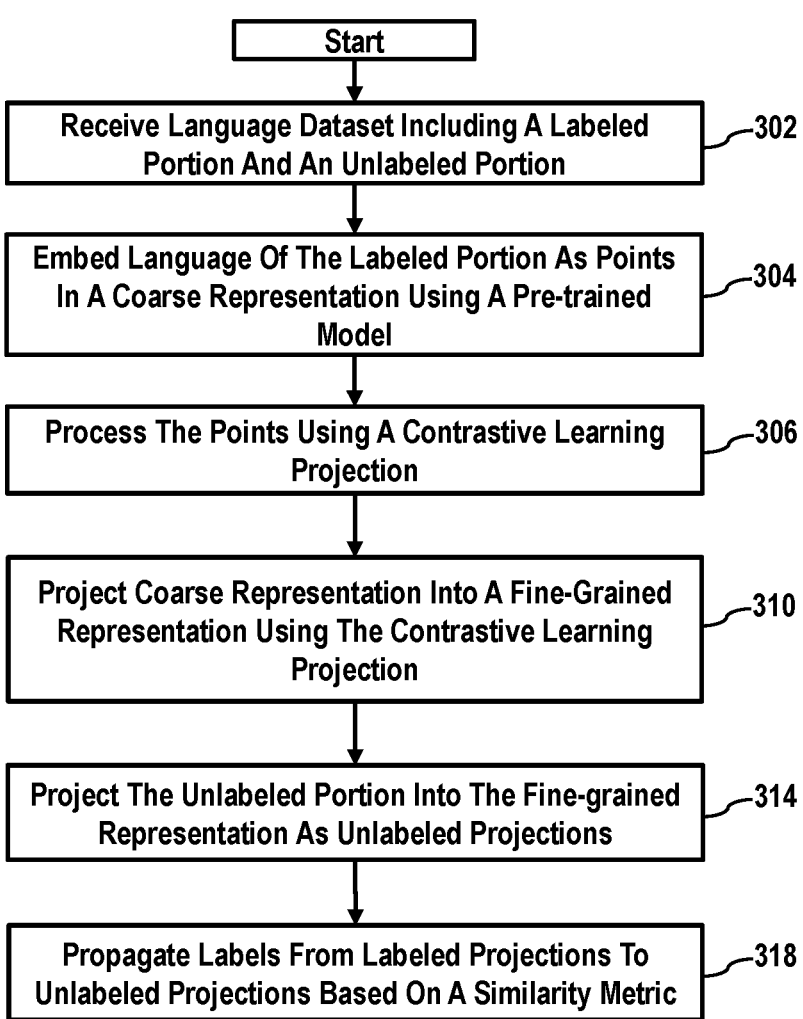
FIG. 3 shows a flowchart of a process used to propagate labels from labeled projections to unlabeled projections in a fine-grained representation, in accordance with one or more embodiments.

FIG. 3 shows a flowchart of a process 300 used to propagate labels from labeled projections to unlabeled projections in a fine-grained representation, in accordance with one or more embodiments. Some embodiments can receive a language dataset that includes a labeled portion and an unlabeled portion, as indicated by block 302.

Some embodiments can embed language data included within the labeled portion as points in a coarse representation using a pre-trained model, as indicated by block 304. Some embodiments include distributing the points in the coarse representation. In some embodiments, the points are distributed across a minority of a first set of dimensions based on the pre-trained model.

Some embodiments can process the points using a contrastive learning projection, as indicated by block 306. For example, processing the points using a contrastive learning projection can include increasing distances between dissimilar points and decreasing distances between similar points. The labels among a set of similar points can be equivalent, and the labels among a set of dissimilar points can be different.

In some embodiments, using a contrastive learning projection can include selecting anchor points from the coarse representation. Some embodiments can include selecting points that have user intention labels that are different from the user intention labels associated with the anchor points (e.g., dissimilar points). Some embodiments can include determining a set of distances between the dissimilar points and the anchor points. Some embodiments can include determining a distribution of the set of distances. Some embodiments can include determining a hard negative threshold demarcating a left tail of the distribution based on a standard deviation associated with the distribution. For example, points that are below the hard negative threshold can be designated as hard negatives, and the process of selecting dissimilar points can be restricted to a group of hard negatives.

Some embodiments can project the coarse representation into a fine-grained representation using the contrastive learning projection, as indicated by block 310. Some embodiments can project the unlabeled portion into the fine-grained representation as unlabeled projections, as indicated by block 314. Some embodiments can include determining a second set of dimensions for the fine-grained representation based on the language dataset. Some embodiments can include distributing projections associated with the language dataset across a majority of the second set of dimensions using the contrastive learning projection.

Some embodiments can propagate labels from labeled projections to unlabeled projections based on a similarity metric, as indicated by block 318. Some embodiments can construct an index of projections in the fine-grained representation using perceptual quantizer encoding and coarse quantization. For example, some embodiments can determine a set of top-n nearest neighbors for projections in the fine-grained representation using a Faiss search. Some embodiments can construct an affinity matrix based on the set of top-n nearest neighbors.

In some embodiments, the similarity metric includes Euclidean distance. For example, propagating labels can include using the affinity matrix to determine distances (e.g., Euclidean distance, or cosine similarity) between unlabeled projections and labeled projections. In some embodiments, the labeled projections associated with the shortest distances to the unlabeled projections are the closest labeled projections. Labels can be propagated from the labeled portion of the language dataset to the unlabeled portion by assigning labels associated with the closest labeled projections to unlabeled projections. This process can be repeated until the unlabeled portion has been partially or entirely labeled, by treating the unlabeled projections with assigned labels as labeled projections, and repeating the above steps.

Some embodiments can include consistency scores. Consistency scores can be determined by comparing labels assigned to unlabeled projections, and filtering out defect samples from the labeled portion of the natural language interactions. Defect samples can be determined by comparing consistency scores to find unlabeled projections associated with the lowest consistency scores, and their closest labeled projections. In some embodiments, the labels associated with the closest labeled projections can then be compared with each other (e.g., using Euclidean distance, cosine similarity, or another distance or similarity metric), and then assigning those labeled projections that are the least similar to the others to the defect samples. The above label propagation steps can then be repeated, minus the defect samples tainting the process.

The above-described embodiments of the present disclosure are presented for purposes of illustration and not of limitation, and the present disclosure is limited only by the claims which follow. Furthermore, it should be noted that the features and limitations described in any one embodiment can be applied to any embodiment herein, and flowcharts or examples relating to one embodiment can be combined with any other embodiment in a suitable manner, done in different orders, or done in parallel. In addition, the systems and methods described herein can be performed in real time. It should also be noted that the systems or methods described above can be applied to, or used in accordance with, other systems or methods.

The operations of each method presented in this disclosure are intended to be illustrative and non-limiting. It is contemplated that the operations or descriptions of FIG. 3 can be used with any other embodiment of this disclosure. In addition, the operations and descriptions described in relation to FIG. 3 can be done in alternative orders or in parallel to further the purposes of this disclosure. For example, each of these operations can be performed in any order, in parallel, or simultaneously to reduce lag or increase the speed of a computer system or method. In some embodiments, the methods can be accomplished with one or more additional operations not described, or without one or more of the operations discussed. Additionally, the order in which the processing operations of the methods are illustrated in this disclosure is not intended to be limiting.

As discussed elsewhere in this disclosure, The system 100 can include an API layer. The API layer can allow the system to generate summaries across different devices. In some embodiments, the API layer can be implemented on the client computing device 102. Alternatively, or additionally, the API layer can reside on one or more of the subsystems 124-128. The API layer (which can be a REST (Representational State Transfer) or web services API layer) can provide a decoupled interface to data or functionality of one or more applications. The API layer can provide a common, language-agnostic way of interacting with an application. Web services APIs offer a well-defined contract, called WSDL (Web Services Description Language), that describes the services in terms of its operations and the data types used to exchange information. REST APIs do not typically have this contract; instead, they are documented with client libraries for most common languages, including Ruby, Java, PHP, and JavaScript. SOAP (Simple Object Access Protocol) web services have traditionally been adopted in the enterprise for publishing internal services, as well as for exchanging information with partners in B2B transactions.

As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety (i.e., the entire portion), of a given item (e.g., data) unless the context clearly dictates otherwise. Furthermore, a "set" can refer to a singular form or a plural form, such that a "set of items" can refer to one item or a plurality of items.

In some embodiments, the operations described in this disclosure can be implemented in a set of processing devices (e.g., a digital processor, an analog processor, a digital circuit designed to process information, an analog circuit designed to process information, a state machine, and/or other mechanisms for electronically processing information). The processing devices can include one or more devices executing some or all of the operations of the methods in response to instructions stored electronically on one or more non-transitory, computer-readable media, such as an electronic storage medium. Furthermore, the use of the term "media" can include a single medium or combination of multiple media, such as a first medium and a second medium. One or more non-transitory, computer-readable media storing instructions can include instructions included on a single medium or instructions distributed across multiple media. The processing devices can include one or more devices configured through hardware, firmware, and/or software to be specifically designed for the execution of one or more of the operations of the methods. For example, it should be noted that one or more of the devices or equipment discussed in relation to FIG. 1 could be used to perform one or more of the operations described in FIGS. 2-3.

It should be noted that the features and limitations described in any one embodiment can be applied to any other embodiment herein, and a flowchart or examples relating to one embodiment can be combined with any other embodiment in a suitable manner, done in different orders, or done in parallel. In addition, the systems and methods described herein can be performed in real time. It should also be noted that the systems and/or methods described above can be applied to, or used in accordance with, other systems and/or methods.

In some embodiments, the various computer systems and subsystems illustrated in FIG. 1 can include one or more computing devices that are programmed to perform the functions described herein. The computing devices can include one or more electronic storages (e.g., a set of databases accessible to one or more applications depicted in the system 100), one or more physical processors programmed with one or more computer program instructions, and/or other components. For example, the set of databases can include a relational database, such as a PostgreSQL™ database or MySQL database. Alternatively, or additionally, the set of databases or other electronic storage used in this disclosure can include a non-relational database, such as a Cassandra™ database, MongoDB™ database, Redis database, Neo4j™ database, Amazon Neptune™ database, etc.

The computing devices can include communication lines or ports to enable the exchange of information with a set of networks (e.g., a network used by the system 100) or other computing platforms via wired or wireless techniques. The network can include the Internet, a mobile phone network, a mobile voice or data network (e.g., a 5G or Long-Term Evolution (LTE) network), a cable network, a public switched telephone network, or other types of communications networks or combination of communications networks. A network described by devices or systems described in this disclosure can include one or more communications paths, such as Ethernet, a satellite path, a fiber-optic path, a cable path, a path that supports Internet communications (e.g., IPTV), free-space connections (e.g., for broadcast or other wireless signals), Wi-Fi, Bluetooth, near field communication, or any other suitable wired or wireless communications path or combination of such paths. The computing devices can include additional communication paths linking a plurality of hardware, software, and/or firmware components operating together. For example, the computing devices can be implemented by a cloud of computing platforms operating together as the computing devices.

Each of these devices described in this disclosure can also include electronic storages. The electronic storages can include non-transitory storage media that electronically stores information. The storage media of the electronic storages can include one or both of (i) system storage that is provided integrally (e.g., substantially non-removable) with servers or client computing devices, or (ii) removable storage that is removably connectable to the servers or client computing devices via, for example, a port (e.g., a USB port, a firewire port, etc.) or a drive (e.g., a disk drive, etc.). The electronic storages can include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages can include one or more virtual storage resources (e.g., cloud storage, a virtual private network, and/or other virtual storage resources). An electronic storage can store software algorithms, information determined by the processors, information obtained from servers, information obtained from client computing devices, or other information that enables the functionality as described herein.

The processors can be programmed to provide information processing capabilities in the computing devices. As such, the processors can include one or more of a digital processor, an analog processor, a digital circuit designed to process information, an analog circuit designed to process information, a state machine, and/or other mechanisms for electronically processing information. In some embodiments, the processors can include a plurality of processing units. These processing units can be physically located within the same device, or the processors can represent the processing functionality of a plurality of devices operating in coordination. The processors can be programmed to execute computer program instructions to perform functions described herein of subsystems 124-128 or other subsystems. The processors can be programmed to execute computer program instructions by software; hardware; firmware; some combination of software, hardware, or firmware; and/or other mechanisms for configuring processing capabilities on the processors.

It should be appreciated that the description of the functionality provided by the different subsystems described herein is for illustrative purposes, and is not intended to be limiting, as any of subsystems described in this disclosure can provide more or less functionality than is described. For example, one or more of subsystems described in this disclosure can be eliminated, and some or all of its functionality can be provided by other ones of subsystems described in this disclosure. As another example, additional subsystems can be programmed to perform some or all of the functionality attributed herein to one of subsystems described in this disclosure.

With respect to the components of computing devices described in this disclosure, each of these devices can receive content and data via input/output (I/O) paths. Each of these devices can also include processors and/or control circuitry to send and receive commands, requests, and other suitable data using the I/O paths. The control circuitry can comprise any suitable processing, storage, and/or I/O circuitry. Further, some or all of the computing devices described in this disclosure can include a user input interface and/or user output interface (e.g., a display) for use in receiving and displaying data. In some embodiments, a display such as a touchscreen can also act as a user input interface. It should be noted that in some embodiments, one or more devices described in this disclosure can have neither user input interface nor displays and can instead receive and display content using another device (e.g., a dedicated display device, such as a computer screen and/or a dedicated input device, such as a remote control, mouse, voice input, etc.). Additionally, one or more of the devices described in this disclosure can run an application (or another suitable program) that performs one or more operations described in this disclosure.

Although the present invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the scope of the appended claims. For example, it is to be understood that the present invention contemplates that, to the extent possible, one or more features of any embodiment can be combined with one or more features of any other embodiment.

As used throughout this application, the word "may" is used in a permissive sense (i.e., meaning having the potential to), rather than the mandatory sense (i.e., meaning must). The words "include," "including," "includes," and the like mean including, but not limited to. As used throughout this application, the singular forms "a," "an," and "the" include plural referents unless the context clearly indicates otherwise. Thus, for example, reference to "an element" or "a element" includes a combination of two or more elements, notwithstanding the use of other terms and phrases for one or more elements, such as "one or more." The term "or" is non-exclusive (i.e., encompassing both "and" and "or"), unless the context clearly indicates otherwise. Terms describing conditional relationships (e.g., "in response to X, Y," "upon X, Y," "if X, Y," "when X, Y," and the like) encompass causal relationships in which the antecedent is a necessary causal condition, the antecedent is a sufficient causal condition, or the antecedent is a contributory causal condition of the consequent (e.g., "state X occurs upon condition Y obtaining" is generic to "X occurs solely upon Y" and "X occurs upon Y and Z"). Such conditional relationships are not limited to consequences that instantly follow the antecedent obtaining, as some consequences can be delayed, and in conditional statements, antecedents are connected to their consequents (e.g., the antecedent is relevant to the likelihood of the consequent occurring). Statements in which a plurality of attributes or functions are mapped to a plurality of objects (e.g., a set of processors performing steps/operations A, B, C, and D) encompasses all such attributes or functions being mapped to all such objects and subsets of the attributes or functions being mapped to subsets of the attributes or functions (e.g., both/all processors each performing steps/operations A-D, and a case in which processor 1 performs step/operation A, processor 2 performs step/operation B and part of step/operation C, and processor 3 performs part of step/operation C and step/operation D), unless otherwise indicated. Further, unless otherwise indicated, statements that one value or action is "based on" another condition or value encompass both instances in which the condition or value is the sole factor and instances in which the condition or value is one factor among a plurality of factors.

Unless the context clearly indicates otherwise, statements that "each" instance of some collection has some property should not be read to exclude cases where some otherwise identical or similar members of a larger collection do not have the property (i.e., each does not necessarily mean each and every). Limitations as to the sequence of recited steps should not be read into the claims unless explicitly specified (e.g., with explicit language like "after performing X, performing Y") in contrast to statements that might be improperly argued to imply sequence limitations (e.g., "performing X on items, performing Y on the X'ed items") used for purposes of making claims more readable rather than specifying a sequence. Statements referring to "at least Z of A, B, and C," and the like (e.g., "at least Z of A, B, or C"), refer to at least Z of the listed categories (A, B, and C) and do not require at least Z units in each category. Unless the context clearly indicates otherwise, it is appreciated that throughout this specification discussions utilizing terms such as "processing," "computing," "calculating," "determining" or the like refer to actions or processes of a specific apparatus, such as a special purpose computer or a similar special purpose electronic processing/computing device. Furthermore, unless indicated otherwise, updating an item can include generating the item or modifying an existing item. Thus, updating a record can include generating a record or modifying the value of an already generated value.

Unless the context clearly indicates otherwise, ordinal numbers used to denote an item do not define the item's position. For example, an item that can be a first item of a set of items even if the item is not the first item to have been added to the set of items or is otherwise indicated to be listed as the first item of an ordering of the set of items. Thus, for example, if a set of items is sorted in a sequence from "item 1," "item 2," and "item 3," a first item of a set of items can be "item 2" unless otherwise stated.

The present techniques will be better understood with reference to the following enumerated embodiments:

1. A system to improve intent recognition in a chatbot using fine-grained representations of language with contrastive learning projections, the system comprising one or more processors and one or more non-transitory media storing program instructions that, when executed by the one or more processors, perform operations comprising: receiving a dataset of logged chatbot conversations comprising a labeled portion and an unlabeled portion, wherein the labeled portion comprises user intention labels assigned to natural language interactions between users and a chatbot; determining a coarse representation of the labeled portion by embedding the natural language interactions using a pretrained model to map the natural language interactions as labeled points in the coarse representation; selecting labeled points from the coarse representation, the labeled points comprising anchor points, similar points to the anchor points, and dissimilar points to the anchor points, wherein the similar points have labels that are identical to anchor point labels, and wherein the dissimilar points have labels that are different from anchor point labels; processing the anchor points, the similar points, and the dissimilar points in a contrastive learning projection configured to maximize a first set of distances between the dissimilar points and the anchor points, and configured to minimize a second set of distances between the similar points and the anchor points; projecting the coarse representation into a fine-grained representation of the labeled portion using the contrastive learning projection to map labeled points as labeled projections, wherein the first set of distances are maximized up to a first margin and the second set of distances are minimized down to a second margin; determining unlabeled embeddings of the unlabeled portion using the pre-trained model; projecting the unlabeled embeddings into the fine-grained representation as unlabeled projections using the contrastive learning projection; and propagating labels from the labeled projections to the unlabeled projections based on a similarity metric.

2. A method to propagate language labels using fine-grained representations of language with contrastive learning projections, comprising: receiving a dataset comprising a labeled portion and an unlabeled portion; determining a coarse representation by embedding the labeled portion using a model; selecting points with labels from the coarse representation, the points comprising anchor points, similar points, and dissimilar points, wherein the similar points have labels that are similar to anchor point labels, and wherein the dissimilar points have labels that are different from anchor point labels; projecting the points from coarse representation into a fine-grained representation using a contrastive learning projection to increase a first set of distances between the dissimilar points and the anchor points and to decrease a second set of distances between the similar points and the anchor points, wherein the fine-grained representation comprises unlabeled projections and labeled projections; and propagating labels from the labeled projections to the unlabeled projections based on a similarity metric.

3. The method of any one of the preceding embodiments, wherein the model comprises at least one version of a word2vec model, wherein determining the coarse representation comprises embedding the labeled portion in vector space using the word2vec model, and wherein selecting dissimilar points to the anchor points comprises: determining anchor vectors based on the anchor points and dissimilar vectors based on the dissimilar points, wherein the anchor vectors and the dissimilar vectors comprise locations in the vector space; measuring distances between the dissimilar vectors and the anchor vectors using cosine similarity; and selecting dissimilar vectors with a similarity threshold below a threshold cosine similarity.

4. The method of any one of the preceding embodiments, wherein the model comprises at least one version of a transformer model, wherein determining the coarse representation comprises embedding the labeled portion as matrices with measures of long-range token dependencies determined by an attention mechanism, and wherein selecting dissimilar points to the anchor points comprises: determining anchor matrices based on the anchor points and dissimilar matrices based on the dissimilar points, wherein the anchor matrices and the dissimilar matrices comprise weighted sums of vectors based on the long-range token dependencies; measuring dot-products of the anchor matrices and the dissimilar matrices; and selecting dissimilar matrices with a dot product below an attention threshold.

5. The method of any one of the preceding embodiments, wherein the dataset comprises user intents corresponding with natural language interactions that comprise a first set of token frequencies, wherein the model comprises a pre-trained model comprising a second set of token frequencies that is different from the first set of token frequencies, and wherein projecting the coarse representation into the fine-grained representation comprises: tuning the pre-trained model with the first set of token frequencies to mitigate a context of the pretrained model; and mapping the natural language interactions according to a context of the user intents.

6. The method of any one of the preceding embodiments, wherein determining the coarse representation comprises: distributing natural language interactions across a first set of dimensions in the coarse representation using the model, wherein the natural language interactions are distributed across a minority of the first set of dimensions; determining a second set of dimensions for the fine-grained representation based on long-range and short-range conditional probabilities from the natural language interactions; and distributing the natural language interactions across a majority of the second set of dimensions using the contrastive learning projection.

7. The method of any one of the preceding embodiments, wherein a set of user intention labels comprise the user intents labelling the natural language interactions of the labeled portion, and wherein selecting anchor points comprises: determining a set of user intention frequencies of the set of user intention labels by slicing the labeled portion according to user intention; determining a set of user intention ratios by dividing the set of user intention frequencies according to a cardinality of the labeled portion; and normalizing the anchor points according to the set of user intention ratios, wherein normalizing the anchor points improves the contrastive learning projection by including anchor points with more frequently occurring user intents from the labeled portion of the natural language interactions.

8. The method of any one of the preceding embodiments, wherein the anchor points comprise the labels, and wherein selecting the similar points to the anchor points comprises at least one of: augmenting the anchor points to create augmentations of the anchor points, wherein the similar points comprise the augmentations; filtering the coarse representation for points comprising labels that are shared by the anchor points, wherein a similar point comprises a label shared by an anchor point; or filtering the coarse representation for points comprising labels shared by the anchor points and augmenting the points.

9. The method of any one of the preceding embodiments, wherein the coarse representation comprises a set of labels, and wherein an anchor point comprises a first label, and wherein selecting dissimilar points to an anchor point comprises: filtering the coarse representation for points comprising the set of labels excluding the first label; or filtering the coarse representation for points comprising the set of labels excluding the first label and augmenting the points.

10. The method of any one of the preceding embodiments, wherein augmenting the anchor points comprises: determining natural language interactions associated with the anchor points using the model; splitting associated natural language interactions into sentences comprising tokens, the tokens comprising positions in the sentences; forming swap augmentations by swapping positions of one or more tokens in sentences; forming gap augmentations by removing one or more tokens from sentences; forming synonym augmentations by using the model to determine synonyms of tokens and replacing one or more tokens with the synonyms; and adding one or more of the swap augmentations, gap augmentations, and synonym augmentations to the similar points.

11. The method of any one of the preceding embodiments, wherein the first set of distances are maximized to a first margin and the second set of distances are minimized to a second margin, and wherein prior to projecting the coarse representation the method comprises: determining the first margin based on a greatest distance between a similar point and an anchor point, wherein dissimilar points that fall beyond the first margin are easy negatives, and wherein dissimilar points that fall within the first margin are hard negatives; and determining the second margin based on a smallest distance between a dissimilar point and the anchor point, wherein similar points that fall beyond the second margin are hard positives, and wherein similar points that fall within the second margin are easy positives.

12. The method of any one of the preceding embodiments, wherein selecting the dissimilar points to the anchor points comprises: selecting points that have different user intention labels to the anchor points; determining a set of distances between the points that have different user intention labels and the anchor points in the coarse representation; determining a distribution of the set of distances, the distribution including a standard deviation; determining a hard negative threshold demarcating a left tail of the distribution based on the standard deviation, wherein points that are below the hard negative threshold are hard negatives; and selecting dissimilar points that are hard negatives.

13. The method of any one of the preceding embodiments, wherein selecting the similar points to the anchor points comprises: selecting points that have identical user intention labels to the anchor points; determining a set of distances between the points that have identical user intention labels and the anchor points in the coarse representation; determining a distribution of the set of distances, the distribution including a standard deviation; determining a hard positive threshold demarcating a right tail of the distribution based on the standard deviation, wherein points that are above the hard positive threshold are hard positives; and selecting similar points that are hard positives.

14. The method of any one of the preceding embodiments, further comprising: construct an index of projections in the fine-grained representation using perceptual quantizer encoding and coarse quantization; determine top-n nearest neighbors for projections in the fine-grained representation using a Faiss search; and construct an affinity matrix based on the top-n nearest neighbors.

15. The method of any one of the preceding embodiments, wherein the similarity metric comprises Euclidean distance, and wherein propagating labels comprises: determine the Euclidean distance between the unlabeled projections and closest labeled projections using the affinity matrix, wherein the closest labeled projections have labels; and assign the labels to unlabeled projections.

16. The method of any one of the preceding embodiments, further comprising: determine consistency scores by comparing labels assigned to each unlabeled projection in the unlabeled projections; and filter out defect samples from the labeled portion of the natural language interactions.

17. One or more non-transitory, computer-readable media, comprising instructions that, when executed by one or more processors, cause operations comprising: receiving a language dataset comprising a labeled portion and an unlabeled portion; determining a coarse representation of the labeled portion using a pre-trained model to embed language of the labeled portion as points; processing the points using a contrastive learning projection to increase distances between dissimilar points and decrease distances between similar points, wherein similar points have equivalent labels and dissimilar points have different labels; and projecting the coarse representation into a fine-grained representation using the contrastive learning projection.

18. The one or more non-transitory, computer-readable media of claim 17, further comprising: projecting the unlabeled portion into the fine-grained representation as unlabeled projections using the contrastive learning projection; and propagating labels from labeled projections to the unlabeled projections based on a similarity metric.

19. The one or more non-transitory, computer-readable media of any one of the preceding embodiments, wherein determining the coarse representation comprises: distributing the points associated with the language dataset across the coarse representation, wherein the points are distributed across a minority of a first set of dimensions based on the pre-trained model; determining a second set of dimensions for the fine-grained representation based on the language dataset; and distributing projections associated with the language dataset across a majority of the second set of dimensions using the contrastive learning projection.

20. The one or more non-transitory, computer-readable media of any one of the preceding embodiments, wherein processing the points comprises: selecting anchor points from the points; selecting points that have different user intention labels to the anchor points; determining a set of distances between the points that have different user intention labels and the anchor points in the coarse representation; determining a distribution of the set of distances, the distribution including a standard deviation; determining a hard negative threshold demarcating a left tail of the distribution based on the standard deviation, wherein points that are below the hard negative threshold are hard negatives; and selecting dissimilar points that are hard negatives.

21. One or more tangible, non-transitory, machine-readable media storing instructions that, when executed by a set of processors, cause the set of processors to effectuate operations comprising those of any of embodiments 1-16.

22. A system comprising: a set of processors and memory storing computer program instructions that, when executed by the set of processors, cause the set of processors to effectuate operations comprising those of any of embodiments 2-21.

What is claimed is:

1. A system to improve intent recognition in a chatbot using fine-grained representations of language with contrastive learning projections, the system comprising one or more processors and one or more non-transitory media storing program instructions that, when executed by the one or more processors, perform operations comprising:

receiving a dataset of logged chatbot conversations comprising a labeled portion and an unlabeled portion, wherein the labeled portion comprises user intention labels assigned to natural language interactions between users and the chatbot;

determining a coarse representation of the labeled portion by embedding the natural language interactions as labeled points using a pre-trained model trained on an unrelated dataset, wherein the coarse representation comprises a constricted embedding space formed by the pre-trained model;

selecting labeled points from the coarse representation, the labeled points comprising anchor points, similar points to the anchor points, and dissimilar points to the anchor points, wherein the similar points have labels that are identical to anchor point labels, and wherein the dissimilar points have labels that are different from anchor point labels;

training a contrastive learning projection by processing the anchor points, the similar points, and the dissimilar points to maximize a first set of distances between the dissimilar points and the anchor points, and minimize a second set of distances between the similar points and the anchor points, wherein the first set of distances are maximized up to a first margin, and wherein the second set of distances are minimized down to a second margin;

projecting the coarse representation into a fine-grained representation of the labeled portion by mapping labeled points as labeled projections using the contrastive learning projection, wherein the fine-grained representation comprises an expanded projection space formed by the contrastive learning projection;

determining unlabeled embeddings of the unlabeled portion using the pre-trained model;

projecting the unlabeled embeddings into the fine-grained representation as unlabeled projections using the contrastive learning projection; and propagating labels from the labeled projections to the unlabeled projections based on a similarity metric in the expanded projection space.

2. A method to propagate language labels, comprising:

receiving a dataset comprising a labeled portion and an unlabeled portion;

determining a coarse representation by embedding the labeled portion using a model;

selecting points with labels from the coarse representation, the points comprising anchor points, similar points, and dissimilar points, wherein the similar points have labels that are similar to anchor point labels, and wherein the dissimilar points have labels that are different from anchor point labels;

projecting the points from the coarse representation into a fine-grained representation, using a contrastive learning projection to increase a first set of distances between the dissimilar points and the anchor points and to decrease a second set of distances between the similar points and the anchor points, wherein the fine-grained representation comprises unlabeled projections and labeled projections; and propagating labels from the labeled projections to the unlabeled projections based on a similarity metric.

3. The method of claim 2, wherein the model comprises at least one version of a word2vec model, wherein determining the coarse representation comprises embedding the labeled portion in vector space using the word2vec model, and wherein selecting dissimilar points to the anchor points comprises:

determining anchor vectors based on the anchor points and dissimilar vectors based on the dissimilar points, wherein the anchor vectors and the dissimilar vectors comprise locations in the vector space;

measuring distances between the dissimilar vectors and the anchor vectors using cosine similarity; and selecting dissimilar vectors with a similarity threshold below a threshold cosine similarity.

4. The method of claim 2, wherein the model comprises at least one version of a transformer model, wherein determining the coarse representation comprises embedding the labeled portion as matrices with measures of long-range token dependencies determined by an attention mechanism, and wherein selecting dissimilar points to the anchor points comprises:

determining anchor matrices based on the anchor points and dissimilar matrices based on the dissimilar points, wherein the anchor matrices and the dissimilar matrices comprise weighted sums of vectors based on the long-range token dependencies;

measuring dot-products of the anchor matrices and the dissimilar matrices; and selecting dissimilar matrices with a dot product below an attention threshold.

5. The method of claim 2, wherein the dataset comprises user intents corresponding with natural language interactions that comprise a first set of token frequencies, wherein the model comprises a pre-trained model comprising a second set of token frequencies that is different from the first set of token frequencies, and wherein projecting the coarse representation into the fine-grained representation comprises:

tuning the pre-trained model with the first set of token frequencies to mitigate a context of the pre-trained model; and mapping the natural language interactions according to a context of the user intents.

6. The method of claim 2, wherein determining the coarse representation comprises:

distributing natural language interactions across a first set of dimensions in the coarse representation using the model, wherein the natural language interactions are distributed across a minority of the first set of dimensions;

determining a second set of dimensions for the fine-grained representation based on long-range and short-range conditional probabilities from the natural language interactions; and distributing the natural language interactions across a majority of the second set of dimensions using the contrastive learning projection.

7. The method of claim 5, wherein a set of user intention labels comprises the user intents labelling the natural language interactions of the labeled portion, and wherein selecting anchor points comprises:

determining a set of user intention frequencies of the set of user intention labels by slicing the labeled portion according to user intention;

determining a set of user intention ratios by dividing the set of user intention frequencies according to a cardinality of the labeled portion; and normalizing the anchor points according to the set of user intention ratios, wherein normalizing the anchor points improves the contrastive learning projection by including anchor points with more frequently occurring user intents from the labeled portion of the natural language interactions.

8. The method of claim 2, wherein the anchor points comprise the labels, and wherein selecting the similar points to the anchor points comprises at least one of:

augmenting the anchor points to create augmentations of the anchor points, wherein the similar points comprise the augmentations;

filtering the coarse representation for points comprising labels that are shared by the anchor points, wherein a similar point comprises a label shared by an anchor point; or filtering the coarse representation for points comprising labels shared by the anchor points and augmenting the points.

9. The method of claim 2, wherein the coarse representation comprises a set of labels, and wherein an anchor point comprises a first label, and wherein selecting dissimilar points to an anchor point comprises:

filtering the coarse representation for points comprising the set of labels excluding the first label; or filtering the coarse representation for points comprising the set of labels excluding the first label and augmenting the points.

10. The method of claim 8, wherein augmenting the anchor points comprises:

determining natural language interactions associated with the anchor points using the model;

splitting associated natural language interactions into sentences comprising tokens, the tokens comprising positions in the sentences;

forming swap augmentations by swapping positions of one or more tokens in sentences;

forming gap augmentations by removing one or more tokens from sentences;

forming synonym augmentations by using the model to determine synonyms of tokens and replacing one or more tokens with the synonyms; and adding one or more of the swap augmentations, gap augmentations, and synonym augmentations to the similar points.

11. The method of claim 2, wherein the first set of distances are maximized to a first margin and the second set of distances are minimized to a second margin, and wherein prior to projecting the coarse representation the method comprises:

determining the first margin based on a greatest distance between a similar point and an anchor point, wherein dissimilar points that fall beyond the first margin are easy negatives, and wherein dissimilar points that fall within the first margin are hard negatives; and determining the second margin based on a smallest distance between a dissimilar point and the anchor point, wherein similar points that fall beyond the second margin are hard positives, and wherein similar points that fall within the second margin are easy positives.

12. The method of claim 2, wherein selecting the dissimilar points to the anchor points comprises:

selecting points that have different user intention labels to the anchor points;

determining a set of distances between the points that have different user intention labels and the anchor points in the coarse representation;

determining a distribution of the set of distances, the distribution including a standard deviation;

determining a hard negative threshold demarcating a left tail of the distribution based on the standard deviation, wherein points that are below the hard negative threshold are hard negatives; and selecting dissimilar points that are hard negatives.

13. The method of claim 2, wherein selecting the similar points to the anchor points comprises:

selecting points that have identical user intention labels to the anchor points;

determining a set of distances between the points that have identical user intention labels and the anchor points in the coarse representation;

determining a distribution of the set of distances, the distribution including a standard deviation;

determining a hard positive threshold demarcating a right tail of the distribution based on the standard deviation, wherein points that are above the hard positive threshold are hard positives; and selecting similar points that are hard positives.

14. The method of claim 5, further comprising:

constructing an index of projections in the fine-grained representation using perceptual quantizer encoding and coarse quantization;

determining top-n nearest neighbors for projections in the fine-grained representation using a Faiss search; and constructing an affinity matrix based on the top-n nearest neighbors.

15. The method of claim 14, wherein the similarity metric comprises Euclidean distance, and wherein propagating labels comprises:

determining the Euclidean distance between the unlabeled projections and closest labeled projections using the affinity matrix, wherein the closest labeled projections have labels; and assigning the labels to unlabeled projections.

16. The method of claim 15, further comprising:

determining consistency scores by comparing labels assigned to each unlabeled projection in the unlabeled projections; and filtering out defect samples from the labeled portion of the natural language interactions.

17. One or more non-transitory, computer-readable media, comprising instructions that, when executed by one or more processors, cause operations comprising:

receiving a language dataset comprising a labeled portion and an unlabeled portion;

determining a coarse representation of the labeled portion using a pre-trained model to embed language of the labeled portion as points;

processing the points using a contrastive learning projection to increase distances between dissimilar points and decrease distances between similar points, wherein similar points have equivalent labels and dissimilar points have different labels; and projecting the coarse representation into a fine-grained representation using the contrastive learning projection.

18. The one or more non-transitory, computer-readable media of claim 17, further comprising:

projecting the unlabeled portion into the fine-grained representation as unlabeled projections using the contrastive learning projection; and propagating labels from labeled projections to the unlabeled projections based on a similarity metric.

19. The one or more non-transitory, computer-readable media of claim 17, wherein determining the coarse representation comprises:

distributing the points associated with the language dataset across the coarse representation, wherein the points are distributed across a minority of a first set of dimensions based on the pre-trained model;

determining a second set of dimensions for the fine-grained representation based on the language dataset; and distributing projections associated with the language dataset across a majority of the second set of dimensions using the contrastive learning projection.

20. The one or more non-transitory, computer-readable media of claim 17, wherein processing the points comprises:

selecting anchor points from the points;

selecting points that have different user intention labels to the anchor points;

determining a set of distances between the points that have different user intention labels and the anchor points in the coarse representation;

determining a distribution of the set of distances, the distribution including a standard deviation;

determining a hard negative threshold demarcating a left tail of the distribution based on the standard deviation, wherein points that are below the hard negative threshold are hard negatives; and selecting dissimilar points that are hard negatives.

* * * * *